United States Patent
Kholaif et al.

(10) Patent No.: US 8,509,731 B2
(45) Date of Patent: Aug. 13, 2013

(54) LOCATION DETERMINATION FOR MOBILE DEVICES IN EMERGENCY SITUATIONS

(75) Inventors: Ahmad Mohammad Mohammad Kholaif, Waterloo (CA); Sasan Adibi, Kitchener (CA); Nayef Mendahawi, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 364 days.

(21) Appl. No.: 12/613,889

(22) Filed: Nov. 6, 2009

(65) Prior Publication Data

US 2011/0111726 A1    May 12, 2011

(51) Int. Cl.
H04M 11/04    (2006.01)
H04W 24/00    (2009.01)

(52) U.S. Cl.
USPC ..................... 455/404.2; 455/456.2

(58) Field of Classification Search
USPC ............. 455/456.1–456.6, 412.1, 414.1, 466, 455/41.2–41.3, 404.1–404.2; 370/312
See application file for complete search history.

(56) References Cited

U.S. PATENT DOCUMENTS

| | | | |
|---|---|---|---|
| 6,304,556 B1 | 10/2001 | Haas | |
| 6,996,403 B2 | 2/2006 | Shi et al. | |
| 7,107,065 B2 | 9/2006 | Overy et al. | |
| 7,181,228 B2 | 2/2007 | Boesch | |
| 7,308,273 B2 * | 12/2007 | Zhang | 455/456.1 |
| 7,920,871 B2 * | 4/2011 | Okuda | 455/456.1 |
| 2004/0053628 A1 * | 3/2004 | Beckman | 455/456.2 |
| 2005/0085257 A1 | 4/2005 | Laird et al. | |
| 2005/0221813 A1 * | 10/2005 | Rajahalme et al. | 455/422.1 |
| 2007/0010261 A1 | 1/2007 | Dravida et al. | |
| 2007/0173273 A1 | 7/2007 | Gogic | |
| 2007/0275730 A1 | 11/2007 | Bienas et al. | |
| 2008/0089318 A1 | 4/2008 | Marshall | |
| 2009/0061895 A1 * | 3/2009 | Vasa | 455/456.2 |
| 2010/0015999 A1 * | 1/2010 | Belz et al. | 455/456.2 |

FOREIGN PATENT DOCUMENTS

| | | |
|---|---|---|
| EP | 1 206 152 A2 | 5/2002 |
| EP | 1206152 A2 * | 5/2002 |
| EP | 1 293 800 A1 | 3/2003 |
| GB | 2 410 653 A | 8/2010 |
| WO | 0190773 A1 | 11/2001 |
| WO | 0203091 A2 | 1/2002 |

OTHER PUBLICATIONS

Extended European Search Report for EP 09175289.9 dated Mar. 22, 2010.

* cited by examiner

*Primary Examiner* — Brandon Miller
(74) *Attorney, Agent, or Firm* — Gowling Lafleur Henderson LLP

(57) ABSTRACT

An emergency locator component for a mobile communication device enables the mobile communication device to obtain location information from other neighboring mobile devices in the event that the mobile communication device is unable to determine its own location. The mobile communication device employs a short-range radiofrequency transceiver to broadcast a request for location information to the neighboring mobile devices. A response containing location information may be received from another mobile device equipped with a similar emergency locator component. Accordingly, this technology enables mobile devices to exchange location information by setting up an ad-hoc network. The location information can be included, for example, in an emergency phone call to an emergency services call center.

21 Claims, 6 Drawing Sheets

LOCATION DETERMINATION FOR MOBILE DEVICES IN EMERGENCY SITUATIONS

CROSS-REFERENCE TO RELATED APPLICATIONS

This is the first application filed for the present invention.

TECHNICAL FIELD

The present technology relates generally to mobile communication devices and, in particular, to techniques for determining the location of a mobile communication device.

BACKGROUND

Mobile communication devices, including cellular phones, smart phones and other wireless communications devices that are able to communicate with a cellular network have become ubiquitous. These mobile devices may be used to place a call to an emergency services dispatcher when the user of the mobile device is in an emergency situation. The call to the emergency services dispatcher is often placed to a common number such as, for example, 911, 999 or 112, which are routed to an emergency call center.

When a call is received from a mobile device at an emergency call center, it is desirable to include location information for the call that may be used to help an emergency worker (dispatcher) locate the mobile device and its user. Unfortunately, many mobile devices are not equipped to provide this location information or, if they are equipped to provide the location information, for example with a Global Positioning System (GPS) receiver, the location information may be temporarily unavailable.

Solutions have been proposed to deal with this problem, which have included using triangulation from cell towers to determine an estimate of the mobile device's position. Other techniques have been applied to determine the location of mobile devices connected to a wireless network, such as a Wi-Fi™ network using the location information of neighbouring access points. Although these techniques may provide a partial solution to the problem of providing location information for a mobile device, improvements to this technology remain highly desirable.

BRIEF DESCRIPTION OF THE DRAWINGS

Various implementations of the novel technology are described below by way of example with reference to the appended drawings in which.

DETAILED DESCRIPTION

Figure 1:
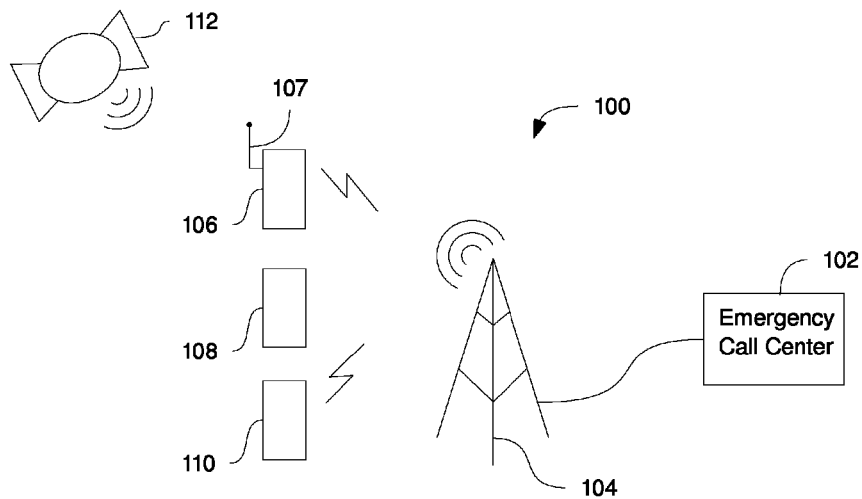
FIG. 1 depicts a schematic of an illustrative environment in which implementations of the present emergency locator may be practised.

The present technology, in general, enables mobile communication devices to exchange and share location information via short-range radiofrequency transceivers. A mobile communication device unable to determine its own location broadcasts a request for location information to neighbouring devices which, in turn, respond with the requested location information, if available, or re-broadcast the request to yet other mobile devices. An ad-hoc network is thus formed to enable neighbouring devices to assist those devices that are unable to determine their own location.

One aspect of the present technology is a mobile communication device comprising a radio transceiver for sending and receiving messages and a memory coupled to a processor for storing and executing instructions to provide on the device an emergency locator component operative to broadcast and receive emergency location request messages using the radio transceiver, send and receive emergency location response messages comprising location information of mobile devices in response to received emergency location request messages, and determine location information for the device based on received emergency location response messages.

Another aspect of the present technology is a method of determining location information of a mobile device. The method may be implemented as a series of instructions executed by a processor of the mobile device. The method comprises broadcasting an emergency location request message using a radio transceiver of the mobile device, receiving one or more emergency location response messages from one or more mobile devices, each of the received emergency location response messages comprising external location information of at least one other mobile device, and determining location information of the mobile device using the external location information of the received location information response messages.

Yet another aspect of the present technology is an emergency locator component for a mobile device comprising an emergency locator control module operative to broadcast and receive emergency location request messages using a radio transceiver of the mobile device, and send and receive emergency location information response messages comprising location information of mobile devices. The emergency locator component further comprises a location determination module operative to determine the location of the mobile device based at least on the location information received in emergency location information response messages.

A further aspect of the present technology is a system for locating a mobile device. The system comprises a first mobile communication device and a second mobile communication device. The first mobile device comprises a radio transceiver for sending and receiving messages and a memory coupled to a processor for storing and executing instructions that provide an emergency locator component operative to broadcast an emergency location request message using the radio transceiver on the first mobile device, receive an emergency location response message comprising location information, and determine location information for the first mobile device based location information received in the emergency location response message. The second mobile communication device includes a Global Positioning System (GPS) receiver for determining location information of the second mobile device, a radio transceiver for sending and receiving messages, a memory coupled to a processor for executing instructions that provide an emergency locator component operative to receive the emergency location request message from the first mobile device and send an emergency location response message comprising location information using position data from the GPS receiver to enable the first device to determine its location.

When a mobile device places an emergency call to such as, for example, 911, 999, 112 or any other local emergency number, the call is routed through a cellular network to an emergency call center. A dispatcher may assess the emergency and dispatch appropriate emergency services (police, ambulance, firefighters) to the location of the mobile device where the user in distress. In order to dispatch the emergency services to the proper location, the location must be known. This location information may be obtained verbally from the mobile device user placing the emergency call (i.e. the caller tells the dispatcher his or her location). Alternatively, the location of the emergency may be obtained from location information that is included with the phone call information. Even if the user of the mobile device knows his location, it is beneficial for the dispatcher to verify the location information provided by the user with that obtained from the phone call. However, not all mobile devices are able to provide location information, or the location information that the mobile device is able to provide is not of a high accuracy.

It is possible to use triangulation of signals from surrounding cellular towers to provide location information; however, this information may not be sufficiently accurate. Furthermore, in an emergency situation it is beneficial to have multiple redundant means of gathering information. The present technology provides systems and methods that can be used to provide an emergency locator to a mobile device.

FIG. 1 depicts a schematic of an environment 100 in which the present technology may be implemented. In this environment, there is an emergency call center 102 that receives emergency phone calls placed to an emergency number and dispatches appropriate emergency services. The emergency call center 102 is connected to a cellular network in order to receive emergency calls placed by a mobile device. The cellular network may comprise numerous cell towers 104 connected together as well as the necessary hardware to connect and operate the cell towers in order to allow a phone call, both emergency calls and non-emergency, or normal, calls. A single base station or cell tower 104 is depicted in FIG. 1. The base station or cell tower 104 is shown communicating with multiple mobile devices 106, 110. Although mobile device 108 in this example is unable to communicate with the cell tower 104, it is still able to communicate directly with the other mobile devices 106, 110 using one or more additional radio transceivers in the mobile device such as short-range radio transceivers. It is understood that a cell tower 104 may support communication with more than the two mobile devices shown. Mobile device 106 is depicted as including a Global Positioning System (GPS) receiver 107, which can receive a GPS signal from multiple GPS satellites in order to determine its location. A single GPS satellite 112 is depicted in FIG. 1. In this example, the mobile device 106 is able to determine its location using the received GPS signals. Depending on the number of GPS signals received, the strength of the GPS signals received, the accuracy of the GPS receiver 107 in the mobile device 106, as well as other possible factors, the mobile device 106 is able to determine its location with a certain accuracy. In this example, mobile devices 108, 110 do not have GPS receivers; however, although not depicted in FIG. 1, mobile devices 108, 110 as well as mobile device 106 are able to communicate with each other using short-range wireless radio transceivers, such as Wi-Fi™ or Bluetooth® radiofrequency transceivers. The mobile devices may be able to communicate with each other using other radio transceivers with a longer range such as a WiMax™ (IEEE 802.16) radio transceiver, which may be useful up to about 15 km for mobile devices. In another implementation, ZigBee® may be used. ZigBee® is a communication protocol based on IEEE 802.15.4-2003 for wireless personal area networks (WPANs). In other variants, the transceiver may be an infrared transceiver or an ultra-wideband transceiver.

As will be elaborated in greater detail below, a mobile device (e.g. mobile device 110) that does not include a GPS receiver is nonetheless able to provide location information when placing an emergency call by obtaining this location information from neighbouring mobile devices. This is accomplished by communicating with the other mobile devices 108 and 106 using the radio transceivers. Mobile device 110 can communicate with the other neighbouring mobile devices 108, 106, either directly with those mobile devices or indirectly through intermediate mobile devices, using the short-range radios in order to obtain location information, for example the location information obtained from the GPS receiver 107 of mobile device 106.

Figure 2:
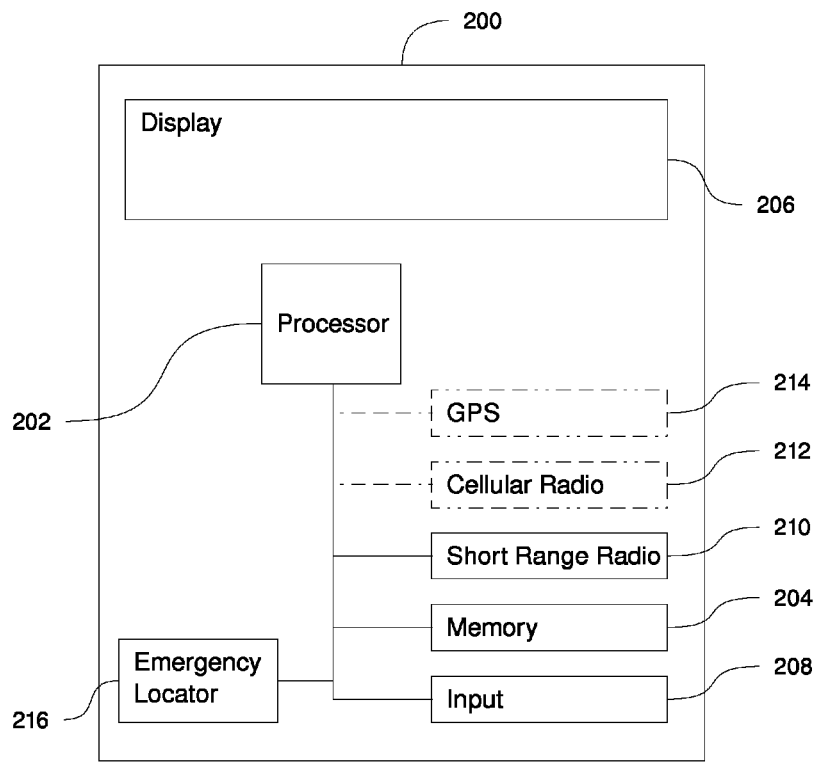
FIG. 2 depicts a schematic of an illustrative mobile device in accordance with implementations of the present technology.

FIG. 2 is a schematic depiction of a mobile device 200 on which the present technology may be implemented. It is understood that mobile devices 106, 108, 110 of FIG. 1 could be similar to the mobile device 200 depicted in FIG. 2. The mobile device 200 comprises a processor 202 that executes instructions and controls the operation of the mobile device 200. The processor 202 may be any suitable processor, central processing unit, microprocessor or other processing device that is known to one skilled in the art. The instructions that are executed by the processor are stored in a memory 204 that is operatively coupled to the processor 202. The memory 204 may comprise any suitable non-volatile memory that is known to one skilled in the art, such as a hard disk drive (HDD), a solid state drive (SDD), a Flash memory, as well as any volatile memory known to one skilled in the art, such as Random Access Memory (RAM).

As depicted in FIG. 2, the mobile device 200 may further comprise a display device 206 for displaying output information to a user of the mobile device 200. The display device 206 may be any suitable display known to one skilled in the art, such as a 7-segment display, a liquid crystal display (LCD), an organic light emitting diode (OLED) display, electronic ink (E-ink) display. The mobile device may further comprise a user input device 208 that enables a user to input information into, and control, the mobile device 200. The user input device 208 may include alphanumeric keys, symbol keys, switches, track balls, track wheels, etc. The input device 208 may further comprise voice recognition components, gesture recognition components, accelerometers or other position tracking components. Furthermore, the input device 208 and the display device 206 may be combined in a single unit, for example a touch-sensitive display screen ("touch-screen"). The mobile device 200 further comprises one or more short-range radios 210 for communicating with other devices wirelessly over a short range. The wireless communication range of the short-range radios 210 may vary depending on various factors including the type of radio, battery strength and the surrounding environment. The short-range radios 210 may include a Wi-Fi™ radio transceiver, which may have a range of approximately 0-100 meters, a Bluetooth® radio transceiver, which may have an approximate range of 0-100 meters, or other short-range wireless radio transceivers as known to one skilled in the art. Although referred to as short-range radio transceiver, it is possible that the radio transceiver 210 be any available radio transceiver that can establish ad-hoc communications with other wireless devices. These additional short-range radio transceivers may include, for example, WiMax™ radio transceivers, push-to-talk radio communication transceivers, etc. The mobile device 200 may further optionally comprise a cellular radio transceiver 212 for communicating with a cell tower, such as cell tower 104 of FIG. 1. If the mobile device 200 includes a cellular radio transceiver 212, the mobile device 200 is able to place calls, including emergency phone calls. The cellular radio transceiver 212 may comprise a code division multiple access (CDMA) transceiver, a General Packet Radio Service (GPRS), Global System for Mobile communication (GSM) or other cellular radio transceiver able to establish communication with a cellular tower as is known to one skilled in the art. In addition to the optional cellular radio transceiver 212, the mobile device 200 may also comprise an optional GPS receiver for receiving GPS signals from GPS satellites, such as the GPS satellite 112 of FIG. 1, in order to determine its location.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another type of position-determining subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system.

References herein to "GPS" are meant to include Assisted GPS and Aided GPS.

As further depicted in FIG. 2, the mobile device 200 further comprises an emergency locator component 216. The emergency locator component 216 may be implemented in hardware and coupled to the processor 202 of the mobile device 200. Alternatively, the emergency locator component 216 may be implemented as code or coded instructions stored in memory (or any other computer-readable medium) that are executed by the processor to provide the emergency locator component 216. The emergency locator component 216 may be implemented as a combination of both hardware and software, for example a low-powered short-range radio transceiver and executable instructions for operating the emergency locator component 216.

The emergency locator component 216 enables the mobile communication device 200 to receive and/or provide location information to or from other neighbouring mobile communication devices. Furthermore, this emergency locator component 216 may optionally be configured to automatically include this location information in an emergency phone call. It should be appreciated that the location information may be received from other components of the mobile device 200 such as, for example, the optional GPS receiver 214 or cellular radio 212, or other mobile devices 210. The location information may be provided to other components of the mobile device 200, other mobile devices, or included as location information within a phone call. The location information may include an absolute location, such as coordinates of latitude and longitude, as well as an accuracy measurement providing an estimate of the accuracy of the location. The accuracy measurement may indicate, for example, that the location determination is accurate to within five (5) meters.

Figure 3:
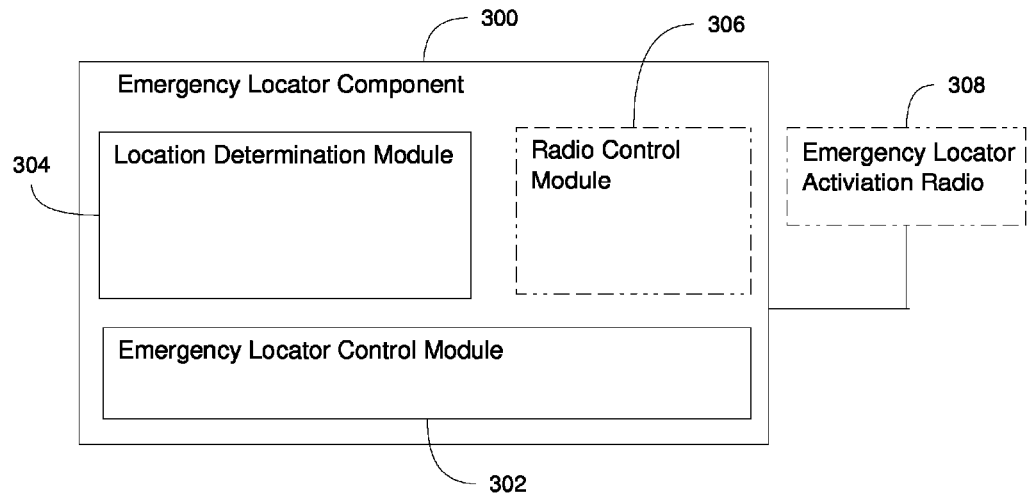
FIG. 3 depicts a schematic of an emergency locator component in accordance with implementations of the present technology.

FIG. 3 is a schematic depiction of an emergency locator component 300 in accordance with implementations of the present technology. It is to be understood that the emergency locator component 216 depicted schematically in FIG. 2 could be implemented in one specific example as emergency locator component 300. The emergency locator component 300 comprises an emergency locator control module 302 that can send and receive emergency location request messages using one or more of the short-range radio transceivers present in the mobile communication device, such as short-range radio transceivers 210 of FIG. 2. The mobile communication device broadcasts the emergency location request messages in order to enlist the assistance of neighbouring mobile devices for the purposes of determining its own location. The emergency locator control module 302 broadcasts the messages so that any other mobile devices that are in the vicinity and that include a compatible emergency locator component receive the broadcast emergency location request message. The emergency locator control module 302 also receives emergency location request messages broadcast from all short-range radio transceivers of mobile communication device broadcasting in the vicinity.

The emergency locator control module 302 is further able to send and receive emergency location information response messages that comprise location information of the mobile device sending the emergency location response message. The location information sent in the emergency location response messages may be determined in various ways, including using location information provided by the GPS receiver if present, or by requesting the location information from other mobile devices by broadcasting, or re-broadcasting the emergency location request messages, as described below.

In addition to the emergency locator control module 302, the emergency locator component 300 further comprises a location determination module 304 for determining the location of the mobile device using location information of emergency location response messages received in response to an emergency location request message broadcast by the mobile device.

The emergency locator component 300 may further optionally comprise a radio control module 306 that is capable of activating (turning on) all of the short-range radio transceivers of the mobile device. This enables the emergency locator control module 302 to broadcast emergency location request messages using all of the available short-range radio transceivers of the mobile device, thereby increasing the probability of another mobile device receiving the emergency location request message.

The emergency locator component 300 may further optionally comprise an emergency locator activation radio 308. The emergency locator activation radio 308 may comprise a short-range radio transceiver. The emergency locator activation radio 308 may comprise a low-power short-range radio transceiver in addition to the short-range radio transceivers of the mobile device, such as short-range radio transceivers 210 of FIG. 2. The emergency locator activation radio 308 may have a transmitter that can broadcast an emergency locator activation request. In one implementation, the emergency locator activation radio 308 also has a receiver that is always on and capable of receiving an emergency locator activation request. The emergency locator activation radio 308 can advantageously be used by a mobile device in an emergency situation to broadcast an emergency locator activation request prior to broadcasting the emergency location request messages. The emergency locator activation request may be received by the receiver of the emergency locator activation radio 308 of neighbouring mobile devices, which (in this implementation) are always on to receive the requests. When a neighbouring mobile device receives an emergency locator activation request, the radio control module 306 activates (turns on) all of the short-range radio transceivers of the mobile device in preparation of possibly receiving an emergency location request message.

In one specific implementation, the neighbouring mobile devices may turn on all of their short-range radio transceivers upon receiving the emergency locator activation request even if they are not location-aware (i.e. not equipped with a GPS receiver or otherwise unable to determine position). These location-unaware devices are still capable of re-broadcasting the emergency location request message to other mobile devices, which may possibly include a GPS receiver. Similarly, the neighbouring mobile devices may also re-broadcast the received emergency locator activation request upon receiving this activation request in order to prepare (forewarn) other mobile devices to possibly receive emergency location request messages.

Figure 4:
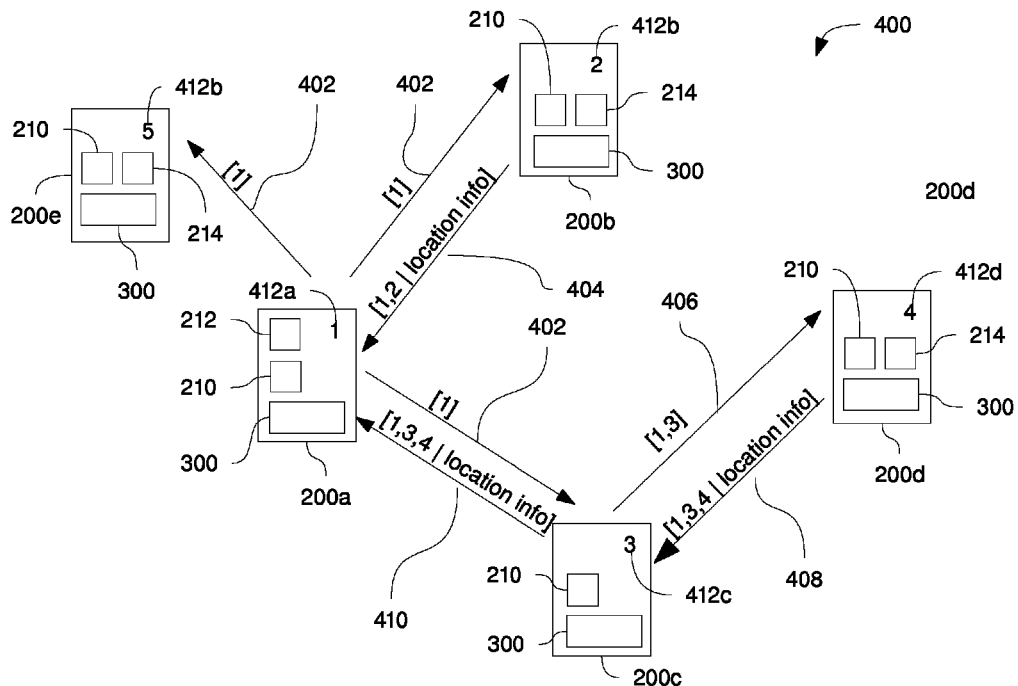
FIG. 4 depicts a schematic showing illustrative messages that may be passed between mobile devices in accordance with implementations of the present disclosure.

FIG. 4 schematically depicts messages that may be communicated between mobile communication devices equipped with the emergency locator described above. Five mobile devices 200a-e are depicted in this example. Mobile device 200a is a mobile device whose user is in an emergency situation. This device, it is assumed for the sake of illustration, does not have location information available (or, alternatively, the location information available is of insufficient accuracy). Mobile device 200b comprises an emergency locator component 300, a short-range radio transceiver 210 and a GPS receiver 214 for determining the location of the mobile device 200b. Mobile device 200c comprises an emergency locator component 300 and a short-range radio transceiver 210; however, it does not include a GPS receiver for determining its location. Mobile device 200d comprises an emergency locator component 300, a short-range radio transceiver 210 and a GPS receiver 214 for determining its location. Mobile device 200e comprises an emergency locator component 300, a short-range radio transceiver 210 and a GPS receiver 214 for determining its location. However, as described further with reference to FIG. 5, the short-range radio transceiver 210 of mobile device 200e is not on in this scenario and so cannot receive any messages.

As depicted in FIG. 4, each mobile device 200a-e may comprise a unique identifier 412a-e, depicted simply as numbers 1-5. The unique identifier may be an IMSI of a subscriber identity module (SIM) or similar identifier or, alternatively, it may be a unique number assigned specifically to the emergency locator component 300. The unique identifier may be used to identify the mobile devices that are involved in responding to the emergency location request message. Including the unique identifier in an emergency location request message of the mobile device that broadcast or re-broadcast the emergency location request message allows the number of hops made between the mobile device sending the initial emergency location request message and the mobile device that has received the message to be determined. Including the unique identifier (UID) of mobile devices in the broadcast, or re-broadcast, emergency location request messages also provides a means to prevent request messages from being continually broadcast and re-broadcast between mobile devices in a circular manner. In addition to the unique identifier, mobile devices may include additional information in the emergency location request message. This additional information may include, for example a Receive Signal Strength Indication (RSSI) value, or other metrics available to the mobile device that may be useful in determining a location of a mobile device. The mobile device may append, or add, this information including both the UID and additional information such as the RSSI value, to a received emergency location request message before retransmitting the emergency location request message.

This information may be included in the emergency location request message in order to enable a mobile communication device to determine if it should respond to an emergency location request message. For example, a mobile device may receive a re-broadcasted emergency location request message that has already been re-broadcast from three (3) other mobile devices. If the RSSI values associated with each of the hops are low, the accuracy of the location may be so poor that the location information would not be useful to the original requesting mobile device. In such a situation, the mobile device may simply not respond to the emergency location request message even though it knows its location. Additionally or alternatively, this information included in the emergency location request message may be used in order to enable a mobile device to selectively respond to multiple emergency location request messages. For example, if a mobile device receives, within a short period of time, two emergency location request messages both originating from the same mobile device, the device receiving both messages may only respond to the emergency location request message that has the highest RSSI value. It is understood that if an RSSI value is associated with each mobile device hop, and this information is included in the emergency location request response, the individual RSSI values of the requesting chain of mobile devices may be combined in order to determine a single RSSI value that may be used to decide which emergency location response message to reply to.

Before placing an emergency call using cellular radio 212, mobile device 200a attempts to determine its location using the emergency locator component 300. The emergency locator component 300 broadcasts an emergency location request message 402 using the short-range radio transceiver 210. The emergency location request message 402 that is broadcast by the mobile device 200a includes the unique identifier of the mobile device 200a. Any mobile devices within range that have an operating and compatible short-range radio transceiver receive the emergency location request message 402. Upon receiving a message the radio transceiver of the receiving mobile device may associate an RSSI value with the received message.

In the example presented in FIG. 4, mobile device 200b and mobile device 200c have their short-range radio transceivers on and are within range of the mobile device 200a (i.e. the device whose user is in an emergency situation). Mobile device 200d is out of communication range of the short-range radio transmitter 210 of mobile device 200a. Mobile device 200e is within communication range of mobile device 200a; however it does not have the appropriate short-range radio transceiver 210 turned on and, as such, cannot receive the emergency location request message 402. Mobile device 200b receives the broadcast emergency location request message and determines that its location is known to a high enough accuracy from its GPS receiver 214 and so sends an emergency location response message 404 back to mobile device 200a. The emergency location response message 404 includes the unique identifiers of all of the mobile devices that were involved in responding to the emergency location request message. The emergency location response message 404 may also include the unique identifier of the mobile device in an emergency situation responsible for initiating the emergency location request. The emergency location response message 404 also includes location information which may include a measure of the accuracy of the location information, as well as additional information from the responding mobile device, such as an RSSI value associated with the received emergency location request message. The mobile device 200a receives the emergency location response message sent from mobile device 200b, and temporarily stores the information in order to receive possible additional emergency location response messages. Alternatively, the mobile device 200a may determine that the location information returned from mobile device 200b is of a sufficiently high accuracy that it is unnecessary to wait for additional emergency location response messages.

In parallel with the emergency location response message being sent from mobile device 200b, mobile device 200c determines that its location is unknown and so re-broadcasts 404 the emergency location request message 402 it received from mobile device 200a. The mobile device 200c re-broadcasts the emergency location request message in the same manner as broadcasting an initial emergency location request message; however, the mobile device 200c first adds its unique identifier to the emergency location request message, and possibly the RSSI value associated with the received emergency location request message. The emergency location request message 406, including the unique identifiers of both mobile devices 200a and 200c, and possibly the RSSI value of mobile device 200c, is broadcast and received by mobile device 200d. Mobile device 200d responds to the emergency location request message 406 in a similar fashion as mobile device 200b responded to emergency location request message 402. The mobile device 200d sends an emergency location request response message 408, including its unique identifier, and possibly an RSSI value, and the unique identifiers included in the emergency location request message 406, as well as the location information, which was determined using the GPS receiver 214 of mobile device 200d. The location information may also include an indication of the accuracy of the location information.

Additionally or alternatively, the location information may comprise the location and additional information that may be used by the mobile device 200a that originated the emergency location request message to determine the accuracy of the location. This additional information may include the number of mobile devices that forwarded the emergency location response message, as well as an RSSI value associated with each of these hops. Mobile device 200c receives the emergency location response message 408 from mobile device 200d and sends it to mobile device 200a as emergency location response message 410.

Although not shown, mobile device 200b may have received emergency location response messages from multiple mobile devices, as is the case with mobile device 200a. In such a case, the mobile device 200b may determine its location information using all of the received emergency location response messages, for example selecting the location information with the highest accuracy, or determining its location information as a combination of all of the received locations. Mobile device 200c may determine its location information from the received emergency location response message, which may involve adjusting the accuracy of the received location information to account for the distance between itself and the mobile device sending the emergency location response message. Mobile device 200c sends an emergency location response message 410, including location information, to mobile device 200a. Mobile device 200a receives the emergency location response message 410 from mobile device 200c, which includes location information from mobile device 200d. Mobile device 200a determines its location using the received emergency location response messages 404 and 410. The mobile device 200a may then place an emergency call using cellular radio 212, which may now include location information even though mobile device 200a was not able to determine the location information by itself. The location information has been provided to the mobile device 200a by establishing ad-hoc connections to other neighbouring mobile devices using short-range radio communications.

As described above, the received location information may be adjusted, for example, to account for the distance between a mobile device receiving location information in an emergency location response message and the mobile device sending the location information. This adjustment may be based on numerous factors including, for example, an RSSI value associated with the received emergency location response message. In this case, the location information received by a mobile device would represent the location information associated with the mobile device that sent the emergency location response message.

Alternatively, a mobile device may adjust the location information to account for the distance between itself and the mobile device to which it has sent the emergency location response message. This adjustment may also be based on, for example, an RSSI value; however, the RSSI value used would be the RSSI value associated with the received emergency location request message to which the mobile device is responding. In this case, the received location information would represent the location information of the mobile device that sent the emergency location request message.

Figure 5:
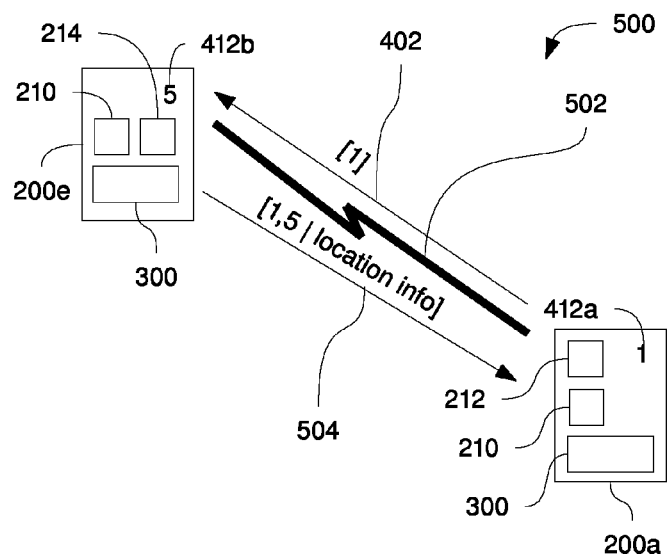
FIG. 5 depicts a schematic showing illustrative messages that may be passed between mobile devices in accordance with implementations of the present technology.

FIG. 5 schematically depicts messages that may be communicated between mobile devices using the novel emergency locator. FIG. 5 shows, by way of example, mobile device 200a and mobile device 200e. As described with reference to FIG. 4, mobile device 200e was unable to assist mobile device 200a in determining its location because its short-range radio transceiver 210 was turned off. With reference to FIG. 5, the emergency locator components 300 of both mobile device 200a and mobile device 200e include an emergency locator activation radio 308. Before broadcasting the emergency location request message 402, mobile device 200a transmits an emergency locator activation request 502 using the emergency locator activation radio 308 of the emergency locator component 300. The emergency locator activation request 502 is received by the emergency locator activation radio 308 of mobile device 200e. Upon receiving the emergency locator activation request 502, the emergency locator component 300 of mobile device 200e turns on all of the short-range radio transceivers 210 of the mobile device 200e, priming the mobile device 200e to receive the emergency location request message 402. After waiting a period of time to allow the mobile device 200e to activate all of its short-range radio transmitters 210, mobile device 200a broadcasts the emergency location request message 402, which is subsequently received and responded to by mobile device 200e with the emergency location response message 504, as described above with reference to FIG. 4.

Alternatives to using an emergency locator activation radio 308 may include having the mobile device transmit via the cellular network an emergency locator activation request, which may be received at the cellular tower (base station) and broadcast to the mobile devices within the communication range of the cellular tower. Alternatively, this emergency locator activation request could be communicated to a centralized server that keeps track of the location of all of the mobile devices. The emergency activation request may then be pushed from the centralized server to those mobile devices that are within the same cell as the requesting mobile device. Upon receiving the emergency locator activation request, the mobile device may temporarily turn on all of its radio transceivers.

As described above, the low-powered short-range emergency locator activation radio 308 enables mobile devices in an emergency situation to inform neighbouring mobile devices that an emergency location request message will be sent shortly, and thus to activate (turn on) one, some or all of the radiofrequency transceivers. It is to be appreciated that the emergency location request messages could be transmitted, and responded to, using only the emergency locator activation radio 308. While this does provide an acceptable solution to determining the location of a mobile device in an emergency situation, as described above, redundancy in emergency situations is desirable. Using the emergency locator activation radio 308 to request devices to turn on their short-range radio transceivers 210 allows the device in an emergency situation to potentially broadcast the emergency location response to more mobile devices, since it is potentially using a plurality of different radios to broadcast the emergency location response message. This can increase the probability that a mobile device will be able to respond with location information.

As described above, a mobile device may reply with location information including a measure, or estimate, of the accuracy of the location information, or the information required by the mobile device to calculate the accuracy of the location. The emergency locator component 300 may be configured to request location information if its location is not known to within a predetermined accuracy threshold. Similarly, the emergency location request component 300 may be configured to only respond to emergency location request messages if the accuracy of the determined location is above a certain accuracy threshold.

Furthermore, the emergency location request message may include an indication of the accuracy within which the location of the mobile device broadcasting the request message is known. The responding mobile devices may then use this as the accuracy threshold value, so those only responses that provide a more accurate location are returned. The determination of the accuracy of the location information may be based on the initial accuracy of the location of the responding mobile device (for example, mobile device 200b or mobile device 200d of FIG. 4). For example, the GPS receiver of the responding mobile device may provide a measurement of the accuracy of the location as determined by the GPS receiver. The accuracy measurement may, for example, indicate that the location is accurate to within 50 meters, 100 meters, etc. The accuracy measurement may be determined, or recalculated, by each mobile device that forwards the emergency location response message back to the mobile device that originally broadcast the request (the device in the emergency situation).

Alternatively, the accuracy measurement may be determined or recalculated only at the device that originally broadcast the emergency location request message. The accuracy measurement, whether determined at each mobile device, or only at the originally requesting device, may be determined, or recalculated, using various methods. These methods may determine or recalculate the accuracy measurement based on, for example, the number of hops taken by the emergency location response message, which may be determined using the number of UIDs in the received emergency location response message, the short-range radio transceiver used to communicate the emergency location response message, and its corresponding communication range, a time between sending the emergency location broadcast message and receiving a corresponding emergency location response message, the strength of the signal communicating the emergency location response message, which may be based on an RSSI value, as well as other information that can be obtained from the mobile device as may be known to those skilled in the art.

From the foregoing, it is now apparent that multiple mobile devices forming an ad-hoc network may use the novel emergency locator component to exchange location information. In one main implementation, this enables a mobile device that is otherwise unable to determine its location to enlist the assistance of neighbouring devices to help the device determine its location. This is particularly useful for a device whose user is in an emergency situation. By broadcasting a request for location information to neighbouring devices, the device may receive location information responses from other devices in the ad-hoc network. Advantageously, by using only short-range radio transmitters to send and receive the request and response messages, the ad-hoc network is kept small which ensures that responding devices remain within an acceptable range of the requesting mobile device. That range can be controlled by limiting the maximum number of times, or hops, that an originating emergency location request message is re-broadcast. It is understood that this range control is not precise since various factors such as maximum transmission power as defined by regulatory domains as well as factors that cannot be easily controlled or known in advance may change this range. These factors may include the battery power of the mobile device and structures, objects, or obstacles in the surrounding environment. Regardless of the number of hops that are used, an emergency location request message is broadcast to as many recipient mobile devices in the vicinity as possible, which in turn respond with location information, if it is available or can be determined. In this fashion, the mobile device in an emergency situation can receive emergency location response messages from a mobile device network that is set up in an ad-hoc fashion as needed. Although short-range radio transceivers communicate with those mobile devices within close proximity, other radio transceivers may be used such as WiMax™. It is recognized that the emergency locator described herein may use any communication means that can be used to send messages directly between two mobile devices, including in addition to the examples above, Infrared communication.

The emergency location request message and the emergency location response message sent between mobile devices participating in the ad-hoc emergency location network may be a short message that is recognized by all of the mobile devices. The specific format, and information, of the emergency location request message may vary depending on the short-range radio transceiver 210 used to transmit the emergency location request message, the communication protocol used to communicate the emergency location request message between mobile devices, the amount of information that is included in the emergency location request message as well as security features of the protocol used to transmit the emergency location request message between messages. As an illustrative example of a possible communication protocol, the emergency location request message and emergency location response message may comprise modified route request (RREQ) messages and route response (RREP) messages of a route selection protocol (RSP). The modified RREQ and RREP messages may have their header information modified to include the emergency location request and response message information, including the unique identifier and RSSI value of the mobile devices and the location information including an accuracy measurement.

Figure 6:
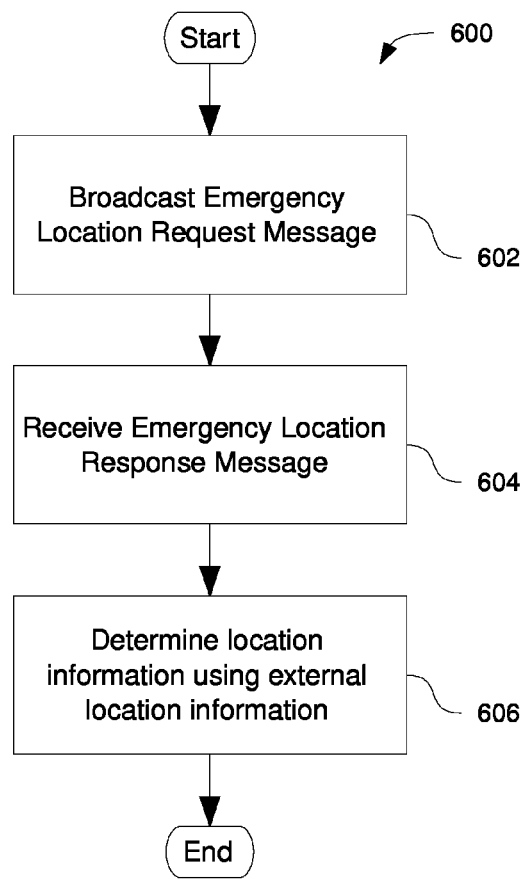
FIG. 6 depicts an illustrative method of determining location information of a mobile device in accordance with implementations of the present technology.

FIG. 6 depicts a method 600 of determining location information for a mobile communication device. The method 600 may be implemented on a mobile communication device that is placing, or going to place, an emergency call. Although not shown explicitly in FIG. 6, it is understood that the mobile device may first determine if there is location information available already. If there is no location information available, or the location information available is not sufficiently accurate, the mobile device may use the method 600 to determine its location information. The method 600 begins with the mobile device broadcasting an emergency location request message (602) using a short-range radio transmitter of the mobile device. The emergency location request message may be broadcast from a mobile device in an emergency situation or the broadcasted emergency location request message may comprise an emergency location request message re-broadcast from a neighbouring mobile device that received an emergency location request message.

After broadcasting the emergency location request message, the mobile device listens for emergency location response messages. Assuming there is at least one other mobile device in the vicinity that received the emergency location request message and can respond with location information, the mobile device will receive an emergency location response message (604).

The mobile device may receive additional emergency location response messages if multiple other mobile devices respond to the emergency location request message. Each of the emergency location responses received by the mobile device comprises external location information of at least one other mobile device. The external location information is location information that is external to the requesting mobile device and can be used by it to determine its own location information. The emergency location response messages may be received from mobile devices that determined their respective location information using a GPS receiver, or other techniques described above or known to one skilled in the art.

The emergency location response messages may be received from the mobile device with GPS receivers either directly or indirectly through other intervening (intermediate) mobile devices. The location information received in the emergency location response messages is referred to as external location information in order to differentiate it from the location information determined by the mobile device using the external location information received from other mobile devices in the emergency location response messages. After one or more emergency location response messages have been received, the external location information of the received emergency location response messages is used to determine location information of the mobile device (606). The location information may comprise location co-ordinates, as well as an accuracy measurement or estimate of the location, or the information that can be used to calculate the accuracy measure. The determined location information may be sent to another mobile device in an emergency location response message, or may be included as location information if the mobile device is placing an emergency phone call.

Additional information may be included in the emergency location response message. For example, in addition to the location information, each mobile device that responds to the request may append an RSSI value associated with the received response message. The RSSI value may be included in the response message to provide additional information to the mobile device responsible for requesting the emergency location that can be used in aiding to determine the location of the requesting mobile device. Additionally or alternatively, each mobile device may use the RSSI value, as well as other information that may be available such as Angle of Arrival (AOA) for directional antennas or multiple antennas as may be used in some protocols such as 802.11n, to calculate an estimate of the distance between the mobile devices responsible for sending the received response message. The estimate of the distance may be aggregated along the response path to provide an estimate of the distance between the mobile device originating the request and the mobile device responding with its known location. The estimation of the distance may provide an accuracy measurement to the received location. As described above, this distance may be calculated at each mobile device along the response path.

Alternatively, the information used to calculate the distance estimate may be appended to the emergency location response message at each mobile device that responds to the request. Alternatively, this information may be added during to the emergency location request message and copied into the emergency location response message. By including this additional information in the emergency location response message, additional information is provided to the initial requesting mobile device, which may be useful in determining its position to a greater accuracy.

Figure 7:
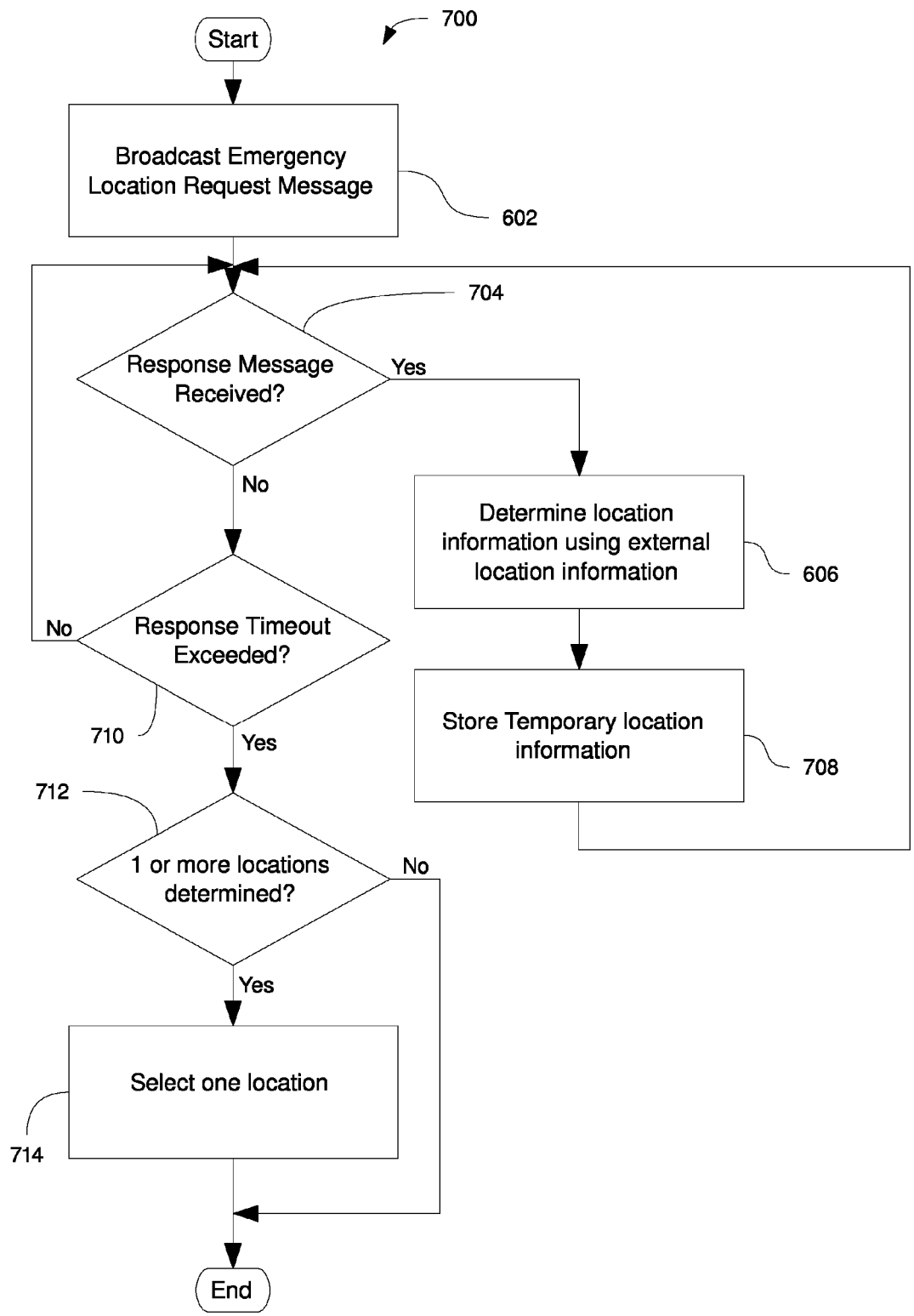
FIG. 7 depicts another illustrative method of determining location information of a mobile device in accordance with implementations of the present technology.

FIG. 7 depicts another illustrative method of determining location information for a mobile communication device. The method begins with a mobile device broadcasting an emergency location request message (602) as described above with reference to FIG. 6. The method then determines if an emergency location response message has been received (704). If an emergency location response message has been received (Yes at step 704), the mobile device determines the location information using the external location information received in the emergency location response message (step

606) as described above with reference to FIG. 6. After the location information has been determined, it is temporarily stored (708).

Additionally or alternatively, the mobile device may determine if the determined location information is of a high enough accuracy, and if it is determined that it is, the method ends. The method may then return to determine if another emergency location response message has been received (step 704). If it is determined that an emergency location response message has not been received (No at step 704) the method determines if a response timeout has occurred (step 710), signalling that enough time has passed to have received emergency location response messages from mobile devices in the vicinity. The response timeout period may be determined by the maximum number of hops that are allowed when re-broadcasting the emergency location request message, the propagation time to send the emergency location request and response messages, as well as the time required at each hop to determine the location information. If the response timeout has not occurred (No at step 710) the method returns to determine if an emergency location response message has been received (step 704). If a response timeout has occurred (Yes at step 710) the method determines if one or more emergency response messages were received (step 712). If no emergency location response messages were received within the response timeout period (No at step 712), the method ends.

If no location information has been determined, the method may end by signalling an error, or other appropriate message to indicate that no location information was determined; however, mobile devices will typically not send response messages back to the requesting mobile device indicating an error or that no location information is available. If one or more emergency location response messages were received within the response timeout period (Yes at step 712), the method then determines the location information using the external location information of the received emergency location response messages. The method may select one set of received external location information to use as the determined location information. The method may simply select the most accurate external location information for the determined location information (714). Once the location information has been determined, for example, by selecting the most accurate of the sets of external location information, the method ends.

If multiple emergency location response messages are received from different mobile devices, the location information may be determined more accurately by combining the multiple sets of received external location information into a single (combined) set of location information. This may be done using various techniques. For example, if three locations are known, with each location known to a given accuracy, the location information of the mobile device may be calculated by using trilateration, which determines the center of three circles given the three circles centers and radii. In this case, the receiving phone would use the location as the center of a circle of a radius determined by the accuracy, or estimated distance between mobile devices. Using the technique of trilateration, the location of the emergency location requesting mobile device may be determined as the center of the three circles representing the received locations of other mobile devices. It will be appreciated that additional techniques for determining the location of the mobile device from the received location information, as well as possible additional information included by mobile devices in the emergency location response message are possible.

Figure 8:
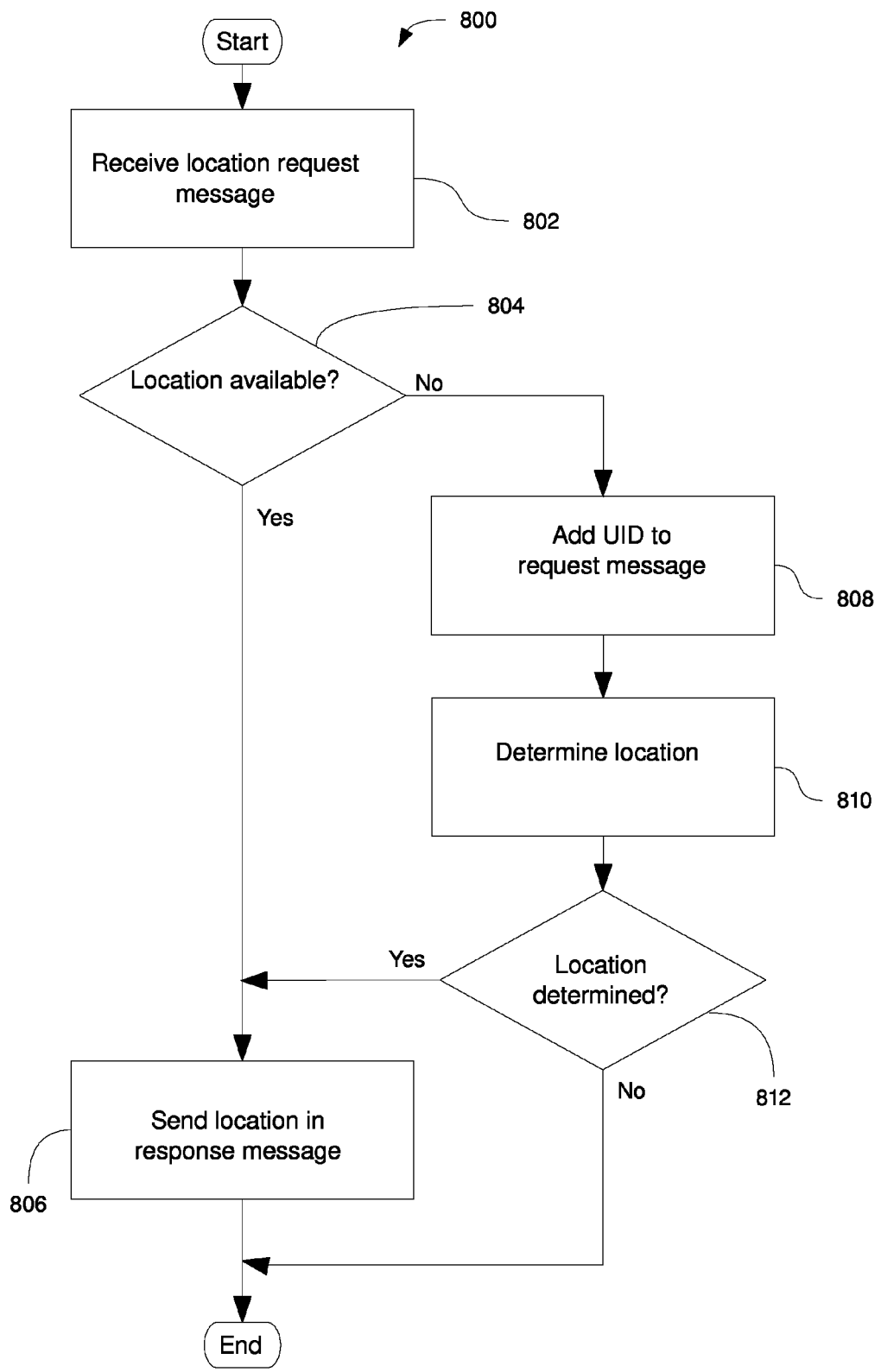
FIG. 8 depicts an illustrative method for a mobile device to participate in determining a location of an other mobile device in accordance with implementations of the present technology.

FIG. 8 depicts a method for a mobile device to participate (assist) in determining a location of another mobile device. The method 800 begins with receiving an emergency location request message that was broadcast by the other mobile device (step 802). The method 800 then determines if location is available (step 804). If the mobile device includes a GPS receiver, this may include determining if the current accuracy of the GPS location is above a predetermined threshold of positional accuracy.

Additionally or alternatively, the mobile device may have location information available from means other than the GPS receiver such as, for example, by cellular tower signal triangulation, or by using wireless access point infrastructure. If the location information is not available, or it is not of a high enough accuracy (No at step 804), the method adds a unique identifier of the mobile device to the received emergency location request message (step 808) and then uses the modified emergency location request message to determine the location information of the mobile device (step 810). In determining the location information the mobile device may re-broadcast the modified emergency location information using a method in accordance with the methods 600 and 700 described above. The method 800 then determines if the location information was determined (step 812). If the location information was determined (Yes at step 812) the method sends the location information to the other mobile device in an emergency location response message (step 806), and the method ends. If the method did not determine the location information (No at step 812), the method ends.

Figure 9:
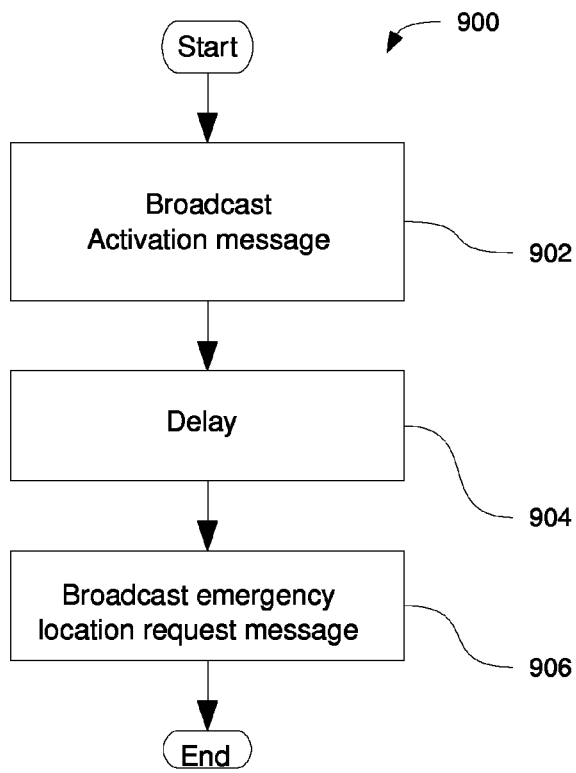
FIG. 9 depicts another illustrative method of determining location information for a mobile device in accordance with implementations of the present technology.

FIG. 9 depicts another illustrative method of determining location information for a mobile device. The method 900 begins with the mobile device sending an emergency locator activation request (step 902) using the low-powered short-range radio transceiver of the mobile device. The method then delays (step 904) for a short period of time in order to allow any neighbouring mobile devices to receive the emergency locator activation request message and turn on one or more of their short-range radio transceivers. The method then determines the location information of the mobile device (step 906). The method may determine the location information of the mobile device using a method in accordance with method 600 or 700 described above with reference to FIG. 6 or FIG. 7. After determining the location information, method 900 ends.

Figure 10:
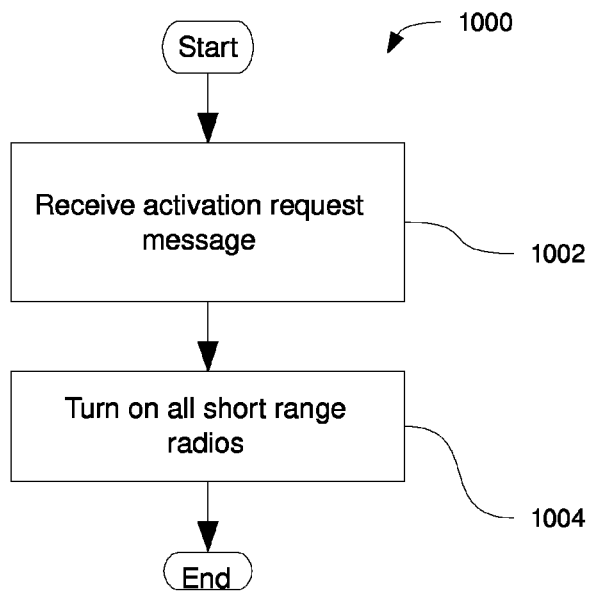
FIG. 10 depicts another illustrative method for a mobile device to participate in determining location information for another mobile device in accordance with implementations of the present technology.

FIG. 10 depicts another illustrative method for a mobile device to participate (assist) in determining location information for another mobile device. The method 1000 begins with receiving with the low-powered short-range emergency locator radio an emergency locator request (step 1002). The method 1000 then activates one or more of the short-range radio transceivers of the mobile device (step 1004) in order to receive an emergency location request message from the other mobile device. The method then participates in determining location information for the other mobile device using a method in accordance with method 800 described above with reference to FIG. 8. After participating in determining the location information the method ends.

Although the above described methods have differentiated between determining location information for a mobile device and participating in determining location information for another mobile device, it is understood that an emergency locator component, such as emergency locator component 300 described above with reference to FIG. 3, that implements both methods may be advantageous. For example, a single emergency locator component that is capable of both determining its own location information with the help of other mobile devices and helping other mobile devices determine their location information may provide cost benefits in implementing, manufacturing and deploying on mobile devices. It may also aid in deploying more emergency locator components, which in turn makes them more effective since it increases the probability that at least one of the mobile device with the emergency locator component can provide accurate, or accurate enough, location information.

Furthermore, although the above has described placing an emergency call from a mobile device using a cellular radio, it will be appreciated that the location information determined as described above may be included in any communication, including emergency calls placed using for example, Wi-Fi™ radio transceivers and unlicensed mobile access (UMA), or other forms of communicating with the emergency call center. Further still, the above has described using the method for determining location information of a mobile device in an emergency situation; however, however it will be appreciated that an emergency situation is used as an example in which users of other mobile devices may accept having wireless radio transceivers of their devices turned on without their control, in order to provide the location information. The emergency locator component may be used in non-emergency situations as well.

The emergency locator component may comprise a single hardware component that can be incorporated into mobile devices. The single hardware component may combine hardware, firmware and software in order to implement the emergency locator component described herein. Alternatively, the emergency locator component may be implemented by the hardware components of the mobile device and may include software expressed as a series of computer executable instructions that configure the hardware of the mobile device to implement the emergency locator component described herein. In other words, these method steps can be implemented as coded instructions in a computer program product or machine-readable medium which, when loaded into memory and executed on the microprocessor of a mobile communications device, perform the steps of the various methods described herein.

This new technology has been described in terms of specific implementations and configurations which are intended to be exemplary only. The scope of the exclusive right sought by the Applicant is therefore intended to be limited solely by the appended claims.

The invention claimed is:

1. A mobile communication device comprising:
a radio transceiver for sending and receiving messages; and
a memory coupled to a processor for storing and executing instructions to determine that a position determining subsystem is unable to provide location information for an emergency call and to execute an emergency locator component operative to:
send a locator activation request for at least temporary activation of one or more of a plurality of radio transceivers of at least another mobile communication device;
broadcast an emergency location request message using the radio transceiver, wherein the emergency location request message includes a unique identifier of the mobile communication device and a received signal strength indication (RSSI) value to enable the at least another mobile communication device to determine if it should respond to the emergency location request message;
receive one or more emergency location response messages comprising location information of the at least one other mobile device in response to the emergency location request message, the response message including information for determining a distance estimate; and
determine location information for the device based on the one or more emergency location response messages and the distance estimate.

2. The mobile communication device as claimed in claim 1 wherein the emergency locator component is further operative to:
receive emergency location request messages; and
send emergency location response messages in response to received emergency location request messages.

3. The mobile communication device as claimed in claim 2 further comprising a Global Positioning System (GPS) receiver capable of determining the location information of the mobile device, wherein the location information is sent in the emergency location response message in response to a received emergency location request message.

4. The mobile communication device as claimed in claim 2 wherein the emergency locator component is configured to re-broadcast received emergency location request messages if the mobile communication device cannot provide location information in response to the received request, the re-broadcast emergency location request messages further including a unique identifier of the mobile device.

5. The mobile communication device as claimed in claim 1 wherein the emergency locator component further comprises a radio control module operative to turn on the radio transceiver to broadcast the emergency location request message.

6. The mobile communication device as claimed in claim 1 further comprising an emergency locator activation radio comprising a transceiver capable of sending and receiving the locator activation requests.

7. The mobile communication device as claimed in claim 1 wherein the emergency location request message comprises a unique identifier of the mobile device.

8. The mobile communication device as claimed in claim 1 wherein the radio transceiver is a short-range radio transceiver selected from the group consisting of:
a radio transceiver compatible with a IEEE 802.11 standard;
a radio transceiver compatible with a Bluetooth® standard;
a radio transceiver compatible with a ZigBee® standard;
an infrared transceiver;
a transceiver compatible with a WiMax™ standard; or
an ultra wideband transceiver.

9. The mobile communication device as claimed in claim 1 wherein the response message comprises an indication of the number of mobile device hops between the mobile device and the one or more other mobile devices providing the location information.

10. The mobile communication device as claimed in claim 1, wherein the locator activation request is sent from the device to the other mobile devices or sent from the device to a centralized server that pushes the locator activation request to the other devices.

11. The mobile communication device as claimed in claim 1 wherein the emergency locator component is further operative to:
receive a further locator activation request from a further device and activate a further radio transceiver;
receive emergency location request messages; and
send emergency location response messages in response to received emergency location request messages.

12. A method of determining location information for a mobile communication device, the method implemented as instructions executed by a processor of the mobile communication device, the method comprising:
  determining that a position-determining subsystem cannot provide location information for an emergency call;
  sending a locator activation request for at least temporary activation of one or more of a plurality of radio transceivers of at least another mobile communication device;
  broadcasting an emergency location request message using a radio transceiver on the mobile communication device wherein the emergency location request message includes a unique identifier of the mobile communication device and a received signal strength indication (RSSI) value to enable the at least another mobile communication device to determine if it should respond to the emergency location request message;
  receiving one or more emergency location response messages from the at least another mobile device in response to the emergency location request message received on the activated radio transceivers, each of the emergency location response messages comprising external location information from the at least another mobile device and information for determining a distance estimate; and
  determining location information for the mobile device using the external location information received in the one or more emergency location response messages and the distance estimate.

13. The method of claim 12 wherein each emergency response message further comprises an indication of a number of mobile device hops between the mobile communication device and the other mobile communication device that has provided the location information in the emergency response message.

14. The method of claim 12 wherein determining the location of the mobile communication device comprises:
  determining an accuracy estimate for the location information for each of the emergency response messages; and
  selecting the location information with the highest accuracy estimate.

15. The method of claim 12 wherein determining the accuracy estimate comprises assigning an accuracy weighting factor to the location information for each of the mobile device hops between the mobile device and the other mobile device, the accuracy weighting factor being based on the type of radio transceiver used to receive the emergency location response message and the strength of the signal of the received emergency location response message.

16. The method of claim 12 further comprising:
  receiving a locator activation request using a radio transceiver; and
  turning on all of the radio transceivers of the mobile device.

17. An emergency locator component stored in memory and executed by a processor of a mobile communication device, the emergency locator component comprising:
  an emergency locator control module operative to:
    broadcast and receive emergency location request messages using a radio transceiver on the mobile device in response to a determination that a position-determining subsystem is unable to provide location information for an emergency call wherein the emergency location request message includes a unique identifier of the mobile communication device and a received signal strength indication (RSSI) value to enable the at least another mobile communication device to determine if it should respond to the emergency location request message; and
    send and receive emergency location information response messages comprising location information of mobile devices and information for determining a distance estimate;
  a location determination module operative to determine the location of the mobile device based at least on the location information received in emergency location information response messages and the distance estimate.

18. The emergency locator component of claim 17, wherein the emergency locator activation radio exchanges the locator activation requests with a centralized server or with other mobile devices.

19. A system for determining a location of a mobile communication device, the system comprising:
  a first mobile communication device comprising:
    a radio transceiver for sending and receiving messages;
    a memory coupled to a processor for executing an emergency locator component operative to:
      broadcast an emergency location request message using the radio transceiver on the first mobile device wherein the emergency location request message includes a unique identifier of the mobile communication device and a received signal strength indication (RSSI) value to enable the at least another mobile communication device to determine if it should respond to the emergency location request message;
      receive an emergency location response message comprising location information and information for determining a distance estimate; and
      determine location information for the first mobile device based location information received in the emergency location response message and the distance estimate; and
  a second mobile communication device comprising:
    a Global Positioning System (GPS) receiver for determining location information of the second mobile device;
    a plurality of radio transceivers for sending and receiving messages;
    a memory coupled to a processor for executing an emergency locator component operative to:
      receive a locator activation request to at least temporarily activate one or more of the plurality of radio transceivers of the second mobile communication device;
      receive the emergency location request message from the first mobile device using one or more of the activated transceivers;
      determine from the unique identifier of the mobile communication device and the received signal strength indication (RSSI) value whether to respond to the emergency location request message; and
      if an emergency location response is to be sent in reply to the emergency location request message, send the emergency location response message comprising location information using position data from the GPS receiver as well the information for determining the distance estimate to enable the first device to determine its location.

20. The system as claimed in claim 19 wherein the first mobile communication device further comprises an emergency locator activation radio comprising a transceiver capable of sending an emergency locator activation request and wherein the second mobile communication device further comprises an emergency locator activation radio comprising a transceiver capable of receiving the emergency locator activation request from the first mobile device or from a centralized server.

21. The system as claimed in claim 19 wherein the emergency locator component in the second mobile communication device is configured to:
   re-broadcast the emergency location request message received from the first mobile communication device when the second mobile communication device cannot provide location information in response to the emergency location request message;
   receive a response message in response to re-broadcasting of the emergency location request message; and
   forward the response message to the first mobile communication device.

* * * * *